(12) United States Patent
MacKenzie (10) Patent No.: US 12,320,312 B2
(45) Date of Patent: Jun. 3, 2025

(54) PISTON ASSEMBLY WITH OPPOSING INJECTION REGIONS FOR AN OPPOSED-PISTON ENGINE

(71) Applicant: ACHATES POWER, INC., San Diego, CA (US)

(72) Inventor: Ryan G. MacKenzie, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 18/451,007

(22) Filed: Aug. 16, 2023

(65) Prior Publication Data

US 2023/0392564 A1 Dec. 7, 2023

Related U.S. Application Data

(63) Continuation of application No. 16/790,552, filed on Feb. 13, 2020, now abandoned, which is a
(Continued)

(51) Int. Cl.
*F02F 3/22* (2006.01)
*B23P 15/10* (2006.01)
(Continued)

(52) U.S. Cl.
CPC .............. *F02F 3/22* (2013.01); *F02F 3/003* (2013.01); *B23P 15/10* (2013.01); *F02B 75/282* (2013.01);
(Continued)

(58) Field of Classification Search
CPC ..... F02F 3/26; F02F 3/003; F02F 3/22; F02B 75/282; B23P 15/10
See application file for complete search history.

(56) References Cited

U.S. PATENT DOCUMENTS 2,236,401 A 3/1941 Gehres ........................ 123/176
2,404,348 A * 7/1946 Boyd ....................... F02F 3/12
92/224

(Continued)

FOREIGN PATENT DOCUMENTS

CN 204476583 U 7/2015
CN 204476584 U 7/2015
(Continued)

OTHER PUBLICATIONS

Office Action for U.S. Appl. No. 16/556,106, mailed Dec. 22, 2020.
(Continued)

*Primary Examiner* — Kevin A Lathers
(74) *Attorney, Agent, or Firm* — Terrance A. Meador (57) ABSTRACT

A piston for an opposed-piston, internal combustion engine includes a crown with an end surface having a bowl shaped to form a combustion chamber with an end surface of an opposing piston in the opposed-piston engine. A substantially circumferential top land of the crown meets the end surface at a substantially circular peripheral edge, and a skirt comprising a sidewall extends from a substantially circumferential belt region of the crown. A wristpin bore with a wristpin axis opens through the sidewall. The end surface of the piston includes a pair of injection regions across which fuel is injected into the bowl. The injection regions are disposed in substantially diametrically-opposed quadrants of the end surface which are defined by the wristpin axis and a connecting rod envelope axis substantially orthogonal to the wristpin axis. Each injection region extends along a respective arc concentric with the substantially circular peripheral edge.

5 Claims, 11 Drawing Sheets

Related U.S. Application Data continuation of application No. PCT/US2018/049214, filed on Aug. 31, 2018.

(60) Provisional application No. 62/555,201, filed on Sep. 7, 2017.

(51) Int. Cl.
*F02B 75/28* (2006.01)
*F02F 3/00* (2006.01)
*F02F 3/26* (2006.01)

(52) U.S. Cl.
CPC ......... *F02F 2003/0061* (2013.01); *F02F 3/26* (2013.01); *F02F 2200/04* (2013.01); *F05C 2201/0448* (2013.01)

(56) References Cited

U.S. PATENT DOCUMENTS

| | | | |
|---|---|---|---|
| 2,690,940 A | 10/1954 | Calling et al. | 309/16 |
| 3,448,664 A * | 6/1969 | Hulsing | F02F 3/0069 92/160 |
| 5,072,654 A | 12/1991 | MacGregor | 92/157 |
| 6,491,013 B1 | 12/2002 | Gaiser et al. | 123/193.6 |
| 7,900,551 B2 | 3/2011 | Benz et al. | F01B 31/08 |
| 8,601,996 B2 | 12/2013 | Miller et al. | 123/193.6 |
| 8,800,528 B2 | 8/2014 | Fuqua et al. | 123/301 |
| 9,038,593 B1 | 5/2015 | Kessler et al. | F02G 75/28 |
| 9,133,923 B2 | 9/2015 | Hofbauer et al. | F16C 3/04 |
| 9,163,505 B2 | 10/2015 | Dion et al. | F01B 7/08 |
| 9,175,725 B2 | 11/2015 | Dion et al. | F16C 33/04 |
| 9,470,136 B2 | 10/2016 | Mackenzie | F01P 3/08 |
| 9,482,145 B2 | 11/2016 | Hofbauer et al. | F02B 17/005 |
| 9,657,683 B2 | 5/2017 | Wilder et al. | F02F 3/0015 |
| 2001/0029840 A1* | 10/2001 | Gaiser | B23P 15/10 92/186 |
| 2002/0179032 A1* | 12/2002 | Ribeiro | F02F 3/0069 123/193.4 |
| 2012/0073538 A1 | 3/2012 | Hofbauer | F02B 75/32 |
| 2012/0192831 A1* | 8/2012 | Tusinean | F02B 23/0663 123/299 |
| 2013/0000482 A1* | 1/2013 | Kopchick | F16J 1/001 92/172 |
| 2013/0213342 A1 | 8/2013 | Burton et al. | F02F 3/26 |
| 2014/0014063 A1 | 1/2014 | Redon | 123/295 |
| 2015/0122212 A1* | 5/2015 | Riffe | F02F 3/16 123/193.4 |
| 2015/0122227 A1 | 5/2015 | Abani et al. | F02B 71/00 |
| 2015/0336223 A1 | 11/2015 | Azevedo et al. | F02F 3/00 |
| 2016/0201544 A1 | 7/2016 | MacKenzie et al. | F01P 3/10 |
| 2016/0290224 A1 | 10/2016 | Abani et al. | F02B 75/02 |
| 2017/0030262 A1 | 2/2017 | Venugopal | F02B 75/282 |
| 2017/0175671 A1 | 6/2017 | Menotti et al. | F02F 3/225 |
| 2020/0018256 A1 | 1/2020 | MacKenzie | F02F 3/00 |

FOREIGN PATENT DOCUMENTS

| | | |
|---|---|---|
| CN | 111033009 B | 9/2023 |
| EP | 3652422 B1 | 8/2021 |
| JP | 7201668 B2 | 12/2022 |
| WO | 2012/158756 A1 | 11/2012 |
| WO | 2018/183954 A1 | 10/2018 |
| WO | 2019/050804 A1 | 3/2019 |

OTHER PUBLICATIONS

Amendment for U.S. Appl. No. 16/556,106, submitted Mar. 16, 2021.
Final Office Action for U.S. Appl. No. 16/556,106, mailed Apr. 15, 2021.
RCE Amendment for U.S. Appl. No. 16/556,106, submitted Jul. 15, 2021.
Office Action for U.S. Appl. No. 16/556,106, mailed Aug. 3, 2021.
Amendment for U.S. Appl. No. 16/556,106, submitted Oct. 21, 2021.
Final Office Action for U.S. Appl. No. 16/556,106, mailed Jan. 26, 2022.
Applicant's Brief on Appeal for U.S. Appl. No. 16/556,106, submitted Jun. 23, 2022.
Examiner's Answer for U.S. Appl. No. 16/556,106, mailed Jul. 26, 2022.
Reply Brief for U.S. Appl. No. 16/556,106, submitted Sep. 19, 2022.
Decision on Appeal for U.S. Appl. No. 16/556,106, mailed May 1, 2023.
Office Action for U.S. Appl. No. 16/790,552, mailed Jan. 15, 2021.
Amendment for U.S. Appl. No. 16/790,552, submitted Apr. 14, 2021.
Office Action for U.S. Appl. No. 16/790,552, mailed Jul. 16, 2021.
Amendment for U.S. Appl. No. 16/790,552, submitted Oct. 12, 2021.
Final Rejection for U.S. Appl. No. 16/790,552, mailed Jan. 21, 2022.
Applicant's Brief on Appeal for U.S. Appl. No. 16/790,552, submitted Aug. 8, 2022.
Office Action for U.S. Appl. No. 16/790,552, mailed Nov. 28, 2022.
Applicant's Brief on Appeal for U.S. Appl. No. 16/790,552, submitted Apr. 18, 2023.
Examiner's Answer for U.S. Appl. No. 16/790,552, mailed Jul. 25, 2023.
Carly, Larry, "Power Pistons", Engine Builder, Jun. 1, 2005, downloaded from http://www.enginebuildermag.com/2005/06/performance-pistons/ on Mar. 30, 2017.
International Search Report and Written Opinion for PCT/US2018/025557, dated Jul. 4, 2018.
International Search Report & Written Opinion for PCT/US2018/049214, dated Dec. 13, 2018.
Communication pursuant to Rule 161(1)/Rule 162 EPC in EP application 18778688.4, dated Feb. 28, 2020.
Response to Communication pursuant to Rule 161(1)/Rule 162 EPC in EP application 18778688.4, submitted Sep. 4, 2020.
Decision to Grant a European patent pursuant to Article 97(1) EPC in EP application 18778688.4, dated May 12, 2021.
English Translation of search report dated Nov. 18, 2022 in CN patent application 2018800547823.
English Translation of office action dated Nov. 18, 2022 in CN patent application 2018800547823.
Instructions to CN associate for response to first office action in CN patent application 2018800547823, sent via Email dated Apr. 6, 2023.
Response to office action in CN patent application 2018800547823, dated Apr. 27, 2023.
Response to Examiner's proposed amendments in CN patent application 2018800547823, dated Jun. 14, 2023.
English Translation of Notification of Allowance and allowed claims in CN patent application 2018800547823, dated Jun. 25, 2023.
Patent Certificate of CN patent 111033009 B in CN patent application 2018800547823.
English Translation of office action dated May 25, 2022 in JP patent application 2020-513579.
Instructions to JP associate for response to office action in JP patent application 2020-513579, sent via Email dated Aug. 29, 2022.
Response to office action in JP patent application 2020-513579, dated Sep. 9, 2022.
English translation of Allowance Notice in JP patent application 2020-513579.
English translation of Patent Certificate of JP patent 7201668 in JP patent application 2020-513579.
First examination report in IN patent application 202017008096, dated Mar. 2, 2022.
Response to first examination report in IN patent application 202017008096, dated Sep. 2, 2022.

* cited by examiner

PISTON ASSEMBLY WITH OPPOSING INJECTION REGIONS FOR AN OPPOSED-PISTON ENGINE

PRIORITY AND RELATED APPLICATIONS

This application is a continuation of U.S. patent application Ser. No. 16/790,552, filed Feb. 13, 2020, which is a continuation of International Patent Application PCT/US2018/049214, "Piston Assembly With Opposing Injection Regions for an Opposed-Piston Engine", filed Aug. 31, 2018, which claims priority to U.S. Provisional Application 62/555,201, "Piston Assembly With Opposing Injection Regions for an Opposed-Piston Engine", filed Sep. 7, 2017. This application contains subject matter related to the subject matter of the U.S. patent application Ser. No. 13/136,955, filed Aug. 15, 2011, for "Piston Constructions for Opposed-Piston Engines," now U.S. Pat. No. 9,163,505, issued Oct. 20, 2015; U.S. patent application Ser. No. 13/776,656, filed Feb. 25, 2013, for "Rocking Journal Bearings for Two-Stroke Cycle Engines," now U.S. Pat. No. 9,175,725, issued on Nov. 3, 2015; U.S. patent application Ser. No. 14/075,926, filed Nov. 8, 2013, for "Lubricating Configuration For Maintaining Wristpin Oil Pressure In A Two-Stroke Cycle, Opposed-Piston Engine," now U.S. Pat. No. 9,038,593, issued on May 26, 2015; and U.S. patent application Ser. No. 14/199,877, filed Mar. 6, 2014, for "Piston Cooling Configurations Utilizing Lubricating Oil From a Bearing Reservoir in an Opposed-Piston Engine," now U.S. Pat. No. 9,470,136, issued on Oct. 18, 2016.

FIELD OF THE INVENTION

The present invention is directed to a piston with a unique end surface construction which makes it particularly suited for use in an opposed-piston internal combustion engine with direct side injection of fuel.

More specifically, the piston has a construction with an end surface configuration in which injection regions have a unique orientation with respect to wristpin and connecting rod features of the piston, which enables stationary oil jets to provide coolant for piston thermal management from positions favorable for achieving a compact engine configuration.

The present invention also relates to a piston construction with a unique location of diametrically-opposed injection regions on the end surface which permits fuel injectors to be positioned more favorably in an opposed-piston engine.

BACKGROUND OF THE INVENTION

The related '725 patent describes a piston construction designed for an opposed-piston engine which includes a wristpin support structure mounted within the interior of the piston skirt. An upper portion of the wristpin support structure provides a wall for an interior annular cooling gallery. Inlet openings in the wall permit streams of liquid coolant enter the annular coolant gallery. The annular cooling gallery achieves an optimal cooling effect when the streams of coolant are aligned with injection trenches on the piston end surface by which fuel emitted through diametrically-opposed fuel injectors enters a combustion chamber. However, the features necessary for attachment of the wristpin bearing support structure to the interior of the skirt greatly restrict design options for placement of stationary oil jets that deliver the streams of coolant to the annular cooling gallery. Furthermore, the restrictions on oil jet placement result in a cascade of additional design restrictions regarding other elements including injection trenches and fuel injectors that limit progress toward realization of good piston thermal management in a compact opposed-piston engine.

Replacement of the separate wristpin support structure with a wristpin bore formed integrally with the piston skirt eliminates the attachment features that restrict placement of stationary oil jets and fuel injectors, thereby enabling a unique piston construction for an opposed-piston with direct side injection that permits stationary oil jets and fuel injectors to be positioned more favorably in an opposed-piston engine.

SUMMARY OF THE INVENTION

In an aspect of the invention, a piston for an opposed-piston engine is provided having a crown with an end surface in which a bowl is configured to form a combustion chamber in cooperation with an adjacent end surface of an opposing piston. A substantially circumferential top land of the crown meets the end surface at a substantially circular peripheral edge, and a skirt comprising a sidewall extends axially away from the substantially circumferential top land. A wristpin bore with a wristpin bore axis is formed in the sidewall. The wristpin bore is provided for receiving a wristpin that couples the piston to a connecting rod that swings in an envelope of motion defined by an envelope axis which is substantially orthogonal to the wristpin bore axis. The end surface of the piston includes a pair of injection regions across which fuel is injected into the bowl. The injection regions are disposed in substantially diametrically-opposed quadrants of the end surface which are defined by the wristpin bore axis and the envelope axis. Each injection region extends along a respective arc concentric with the substantially circular peripheral edge. In some cases, the arcuate extent of each injection region may subtend an angle of about 50-70 degrees with the vertex of the angle being at the center of the substantially circular peripheral edge.

Preferably, the wristpin bore has a first opening formed in a first pin boss in a first wall portion of the sidewall and a second opening formed in a second pin boss in a second wall portion of the sidewall, and the openings are coaxially aligned along the wristpin bore axis.

In some aspects, an injection trench is formed in each injection region and injection trench extends from the substantially circular peripheral edge to the bowl.

In other aspects, the end surface has two diametrically opposed injection trenches, each injection trench being formed in a respective injection region and being shaped for guiding a spray of injected fuel into the bowl.

In another aspect of the invention, an opposed-piston engine has a cylinder block with a plurality of cylinders disposed in an inline array along a length of the cylinder block. A pair of pistons is disposed in opposition in each cylinder. Each piston has a wristpin with a wristpin axis, which couples the piston to a connecting rod that swings in a connecting rod motion envelope having an envelope axis. The envelope axis is substantially orthogonal to the wristpin axis. The piston has a crown with an end surface and a bowl in the end surface configured to form a combustion chamber in cooperation with a bowl of an adjacent end surface of an opposing piston. The end surface includes a pair of injection regions across which fuel is injected into the bowl. The injection regions are disposed in respective diametrically-opposed quadrants of the end surface that are defined by the wristpin axis and the envelope axis. Each injection region extends along a respective arc concentric with the substantially circular peripheral edge.

These features of the invention result in advantages that will be readily understood when the following detailed description of the invention is considered in conjunction with the below-described drawings.

DETAILED DESCRIPTION OF A PREFERRED EMBODIMENT

Opposed-Piston Engine: By way of background, an opposed-piston engine is an internal combustion engine in which two pistons are disposed in opposition in the bore of a cylinder. During engine operation, combustion takes place in a combustion chamber formed in the bore between the end surfaces of the two pistons when the pistons move through respective top center locations in the bore. When used herein, the term "combustion chamber" refers to the minimum volume within the cylinder that is bounded by the end surfaces of the pistons and the annular portion of the bore between the end surfaces during operation of the engine during each cycle of engine operation.

Figure 1:
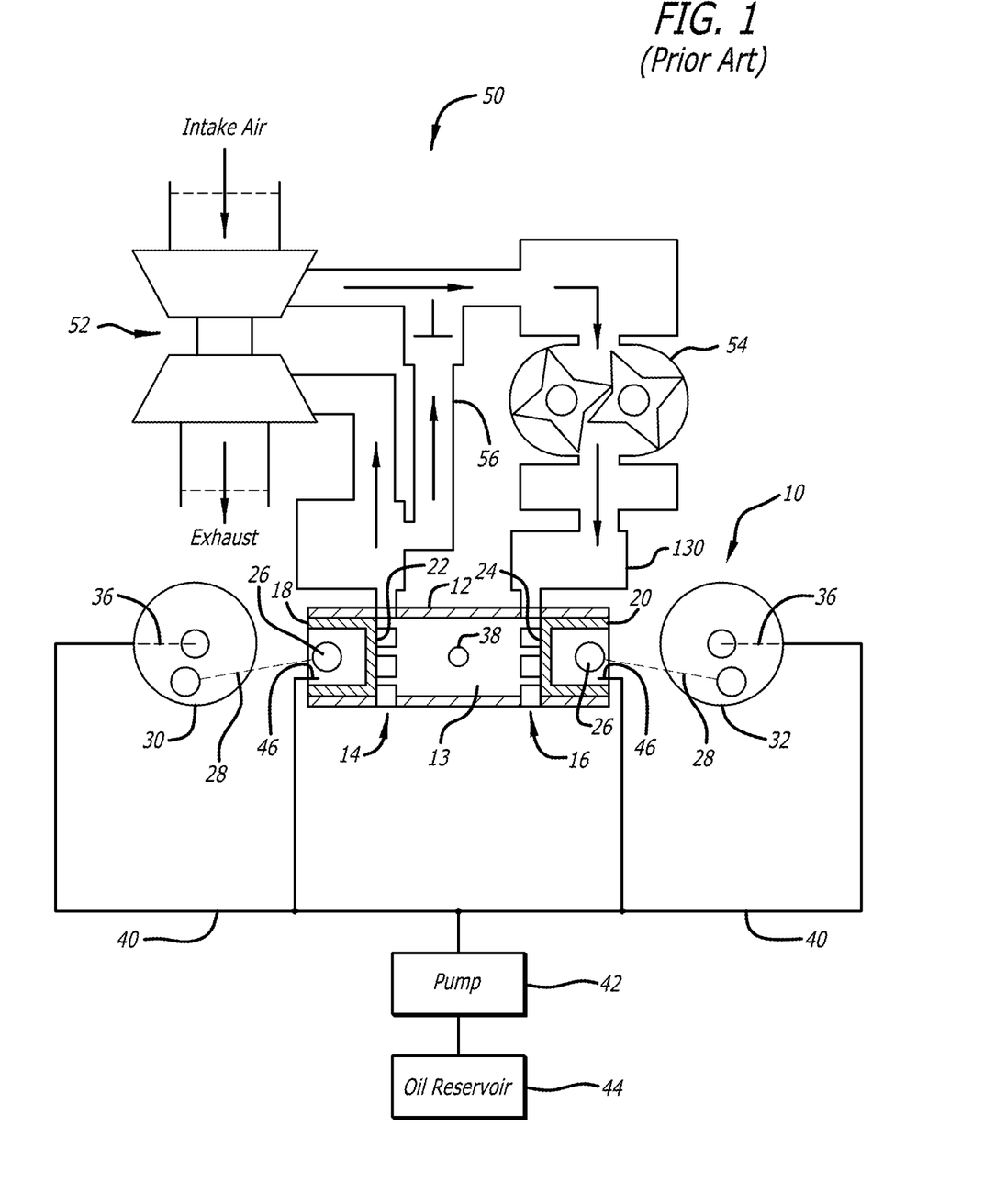
FIG. 1 is a schematic diagram showing an opposed-piston engine, and is properly labeled "Prior Art."

As seen in FIG. 1, an opposed-piston engine 10 has at least one ported cylinder 12. For example, the engine may have one ported cylinder, two ported cylinders, three ported cylinders, or four or more ported cylinders. For purposes of illustration, the engine 10 is presumed to have a plurality of ported cylinders. Each cylinder 12 has a bore 13. Exhaust and intake ports 14 and 16 are formed near respective ends of the cylinder such that the exhaust port 14 is longitudinally separated from the intake port 16. Each of the exhaust and intake ports 14 and 16 includes one or more circumferential arrays of openings. Exhaust and intake pistons 18 and 20 are slidably disposed in the bore 13 with their end surfaces 22 and 24 opposing one another. The exhaust pistons 18 are coupled to a crankshaft 30, and the intake pistons 20 are coupled to a crankshaft 32. Each of the pistons is coupled to its associated crankshaft by a wristpin 26 and a connecting rod 28. For this disclosure, a cylinder may comprise a boring or a formed space in a cylinder block, or a liner (or sleeve) retained in a tunnel in a cylinder block.

In the engine 10, a lubrication system that supplies oil to lubricate moving parts of the engine 10 includes an oil reservoir 44 from which pressurized oil is pumped by a pump 42 to a main gallery 40. The main gallery 40 supplies pressurized oil to the crankshafts 30 and 32, typically through drillings 36 to the main bearings (not seen). From grooves and/or passageways in the main bearings, pressurized oil is provided to grooves in the big end bearings of the connecting rods 28. From there, pressurized oil flows through passageways formed in the connecting rods 28 to the wristpins 26.

The pistons 18 and 20 are cooled by provision of streams of oil emitted by stationary oil jets 46 that are mounted in the engine near respective ends of the cylinder 12. Each oil jet 46 comprises a nozzle aimed through an open end of the cylinder 12 at an inlet passage of the annular cooling gallery of the piston.

In some aspects, which are not intended to be limiting, the engine 10 is equipped with an air management system 50 that may include one or more of a turbocharger 52, a supercharger 54, and an EGR channel 56.

The operational cycle of an opposed-piston engine according to FIG. 1 is well understood. In response to combustion occurring between their end surfaces 22, 24, the opposed pistons 18, 20 move away from respective top center (TC) locations in the cylinder. While moving from TC, the pistons keep their associated ports closed until they approach respective bottom center (BC) positions. The pistons may move in phase so that the exhaust and intake ports 14, 16 open and close in unison; alternatively, one piston may lead the other in phase, in which case the intake and exhaust ports have different opening and closing times. As the pistons move through their BC locations exhaust products flowing out of the exhaust port 14 are replaced by charge air flowing into the cylinder through the intake port 16. After reaching BC, the pistons reverse direction and the ports are again closed by the pistons. While the pistons continue moving toward TC, the charge air in the cylinder 12 is compressed between the end surfaces 22 and 24. Each end surface is shaped for forming a combustion chamber with the adjacent end surface of the opposing piston. As the pistons advance to their respective TC locations in the cylinder bore, fuel is directly injected through one or more openings 38 in the sidewall of the cylinder 12 into the charge air (this process is called "direct side injection"), and the mixture of charge air and fuel is compressed in the combustion chamber formed between the end surfaces 22 and 24 of the pistons 18 and 20. When compression causes the mixture to reach an ignition temperature, the fuel ignites. Combustion results, driving the pistons apart, toward their respective BC locations.

Piston Constructions:

A piston for an opposed-piston engine (an "opposed piston") is constructed differently from a conventional piston that forms a combustion chamber against the cylinder head of an engine where valve-controlled intake and exhaust ports are located. In opposed-piston engines the pistons move together in a ported cylinder to form a combustion chamber between their end surfaces. In addition, the movements of the opposed pistons control the opening and closing of the cylinder ports to allow charge air to flow into and exhaust to flow out of the engine's cylinders.

In the first instance, the end surface of a conventional piston typically includes a bowl shaped to enable the mixing of charge air with a spray of fuel injected along the axis of the cylinder in which the piston moves. Such a bowl has a shape that is symmetric with respect to the piston's axis. In contrast, the end surface of an opposed piston has a bowl whose features must accommodate fuel injection in a radial or tangential direction of the cylinder, typically from a pair of diametrically opposed fuel injectors. Such a bowl is not symmetric with respect to the piston's axis.

In the second instance, a conventional piston supports one ring band region and a wristpin. However, in addition to these features, an opposed piston must support a second ring band region near an open end of the piston in order to scrape excess oil from the cylinder bore and maintain the seal of an intake port or an exhaust port when the piston moves through top center. The second ring band necessitates a longer piston skirt for an opposed piston than for a conventional piston.

A third feature which characterizes an opposed piston is a linkage assembly including a wristpin bearing support that allows for the interaction of a connecting rod, a wristpin, and the piston in an environment where the wristpin undergoes continuous compressive loading throughout the operational cycle of the engine. U.S. Pat. No. 9,470,136 describes and illustrates a piston bearing assembly in an opposed-piston engine wherein a biaxial wristpin/bearing interface induces periodic separation of axially distributed bearing segments to permit lubricant to reach the opposing external surfaces of the wristpin and the bearing. The wristpin is supported in a generally cubic structure which is installed in the interior of the piston, where the structure is completely enclosed in the piston skirt.

The wristpin support structure is separate from the cylinder skirt, and so the exterior of the skirt is free of bosses and wristpin bores such that it presents a continuous cylindrical aspect to the cylinder bore, thereby providing a highly effective seal between the combustion chamber and crankcase when outfitted with nothing more than two sets of piston rings. However, the price paid is a complex and costly construction which necessitates multiple assembly steps and adds weight to the piston. Further, although the continuous cylindrical aspect of the skirt enables an effective seal between the combustion chamber and the crankcase, it also results in generation of friction in the interface between the skirt and the cylinder bore.

Figure 2:
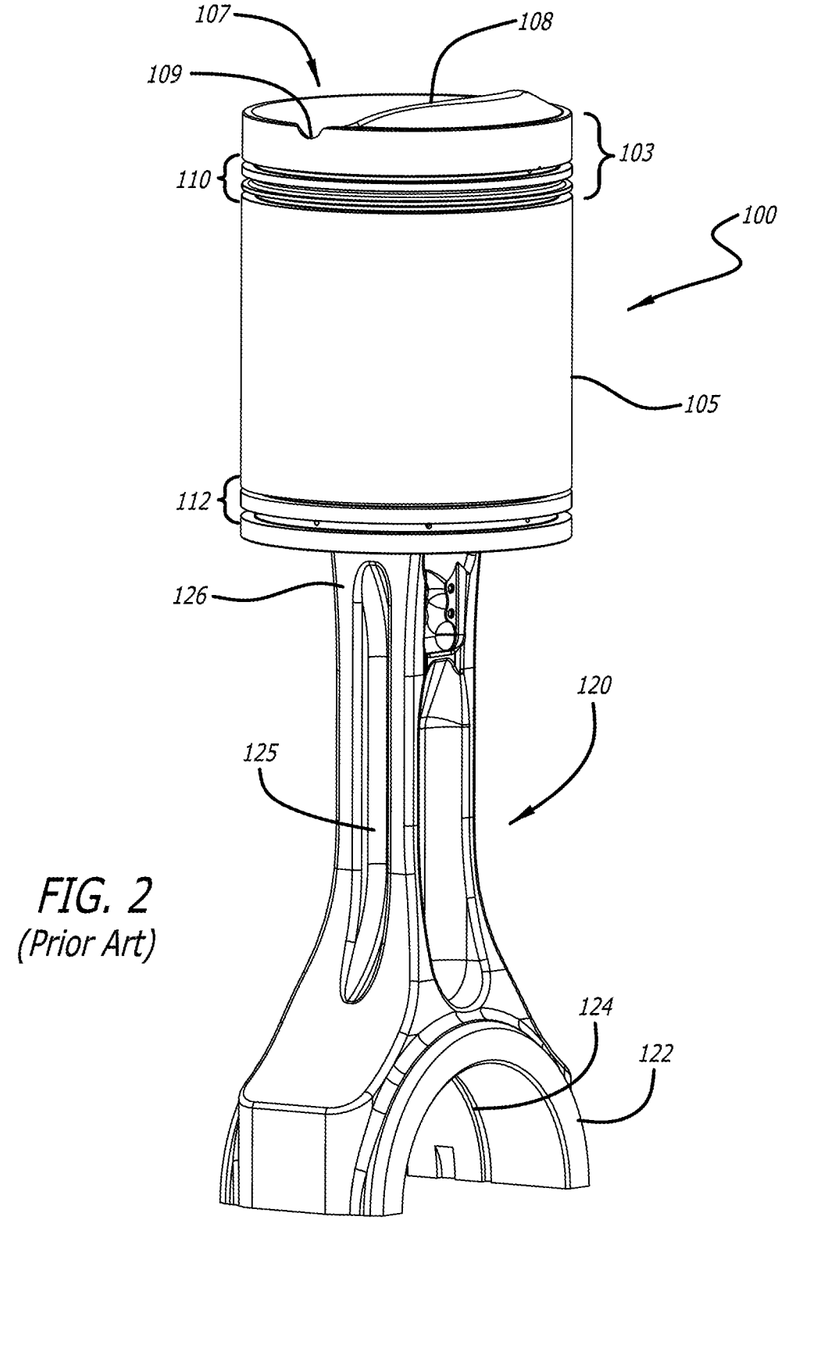
FIG. 2 is a side view, in perspective, of a piston/connecting rod assembly for a two-stroke cycle, opposed-piston engine, and is properly labeled "Prior Art."

FIG. 2 is a perspective view of a prior art piston assembly for an opposed-piston engine. The piston 100 has a crown 103, and a skirt with a generally tubular sidewall 105. An end surface 107 of the crown has a bowl 108 configured to form a combustion chamber in cooperation with the end surface bowl of an opposing piston. Opposing injection trenches are provided for guiding fuel emitted by fuel injectors into the bowl. One such injection trench 109 is visible in the figure. An inner ring belt region 110 is provided in a circumferential side surface of the crown for seating compression rings and oil control rings. An outer ring belt region 112 is provided in the skirt's sidewall for seating oil scraper rings. A connecting rod 120 has a big end 122 for coupling to a crank throw of a crankshaft (not seen) and a small end (not seen) which is positioned in the interior space defined by the sidewall 105. An oil groove 124 is formed in the bearing surface of the large end 122. A drilled oil delivery passage (not seen) extends longitudinally in the connecting rod 120 from the oil groove 124 to the small end of the connecting rod. Elongate longitudinal slots 125 are formed in opposite sides of the shaft 126 of the connecting rod between the big end and small end to accommodate stationary oil jets (not shown) as the connecting rod swings with a pendulum-like motion during engine operation.

Figure 3:
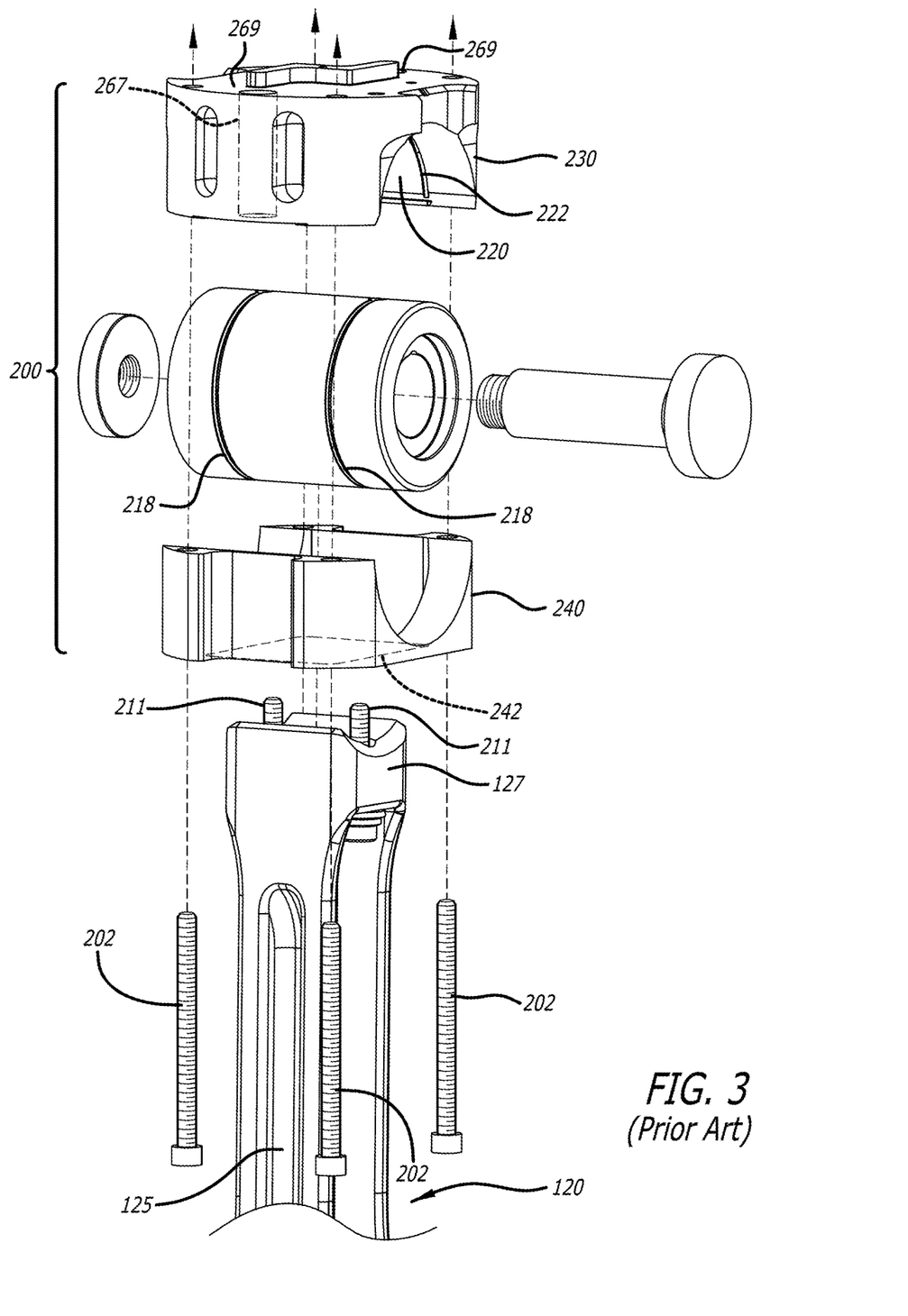
FIG. 3 is an exploded view of a bearing support structure of the piston shown in FIG. 2, and is properly labeled "Prior Art."
Figure 4:
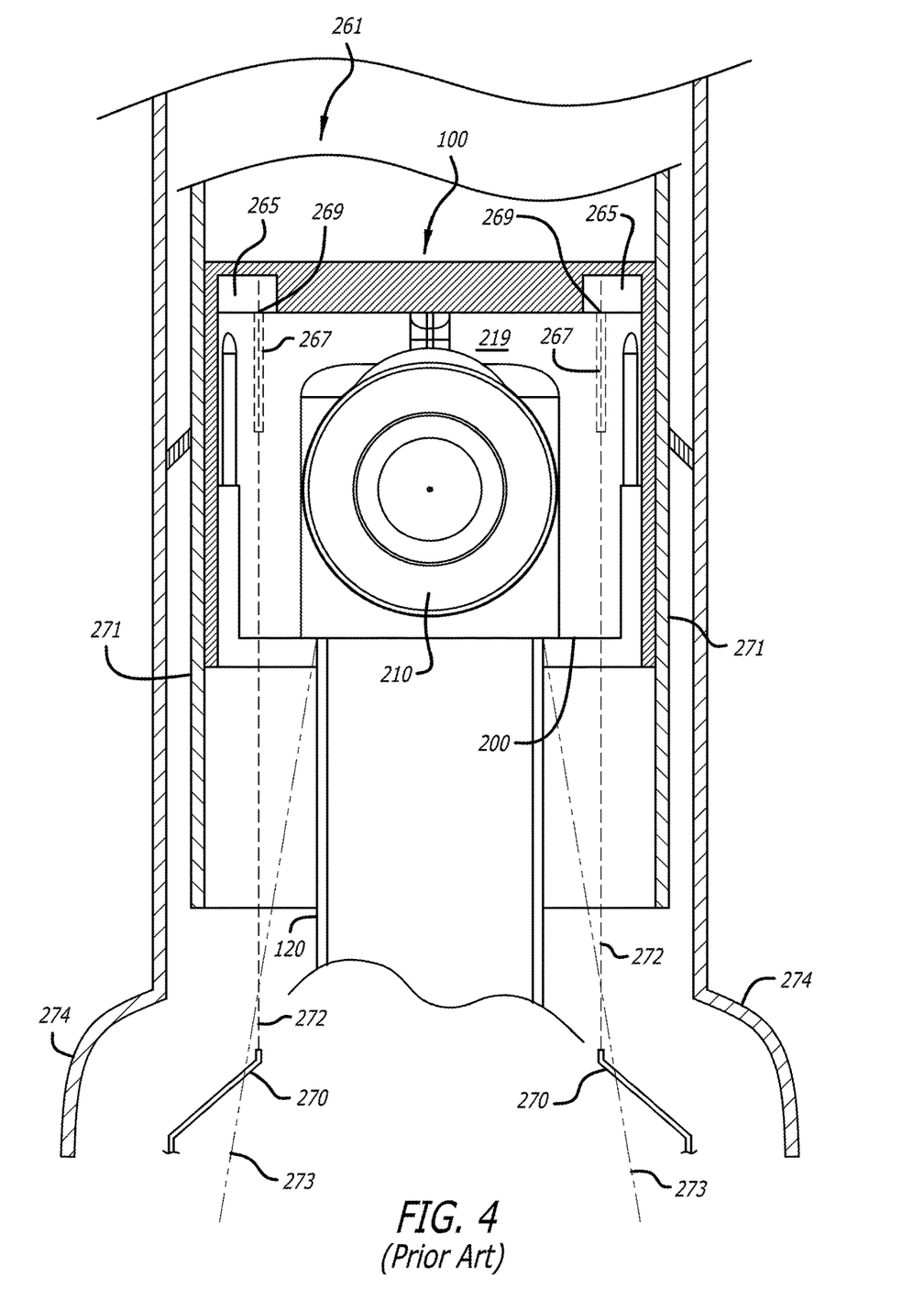
FIG. 4 is a partially schematic sectional view, in elevation, of the piston of FIGS. 2 and 3 in a cylinder block of an opposed-piston engine, and is properly labeled "Prior Art."

With reference to FIGS. 3 and 4, the piston 100 includes a wristpin bearing assembly 200 fixed to the crown undersurface and disposed in space encircled by the skirt 105. As shown in FIG. 3, a wristpin support structure includes an upper support member 230 and a lower support member 240. The upper support member 230 includes a bearing surface 220 that receives a wristpin 210 mounted to the small end 127 of the connecting rod 120 by threaded fasteners 211. The upper and lower support members 230 and 240 are joined around the wristpin 210 and secured to the crown undersurface by four fasteners 202 (three of which are visible in FIG. 3) that are threadably seated in interior bosses (not seen) formed in the crown undersurface. As seen in FIG. 3, an opening 242 in the lower bearing support member 240 receives the connecting rod 120. When assembled, the wristpin support structure retains the wristpin 210 for oscillation on the bearing surface 220 caused by pendulum-like oscillation of the connecting rod 120 in the opening 242. Similar single-unit wristpin bearing structures are shown in U.S. Pat. Nos. 9,038,593 and 9,175,725.

FIG. 4 shows the wristpin bearing assembly 200 installed in the piston 100 with the piston disposed in the bore of a cylinder 261 of a prior art opposed-piston engine. When assembled in the manner shown, the upper support member 230 provides a bottom wall of an interior annular cooling gallery 265. As shown in FIGS. 3 and 4, the upper support member 230 includes inlet passageways 267 with inlet openings 269 in the bottom wall of the interior annular cooling gallery 265. As per FIG. 4, stationary oil jets 270 are positioned to direct streams of oil 272 to the inlet passageways 267 through which the streams enter into the annular cooling gallery 265. In some instances, a stationary oil jet may be in substantial alignment with an inlet passageway, as is shown in the figure; in other instances, the stream of oil emitted by a stationary jet may be deflected to an inlet passageway. It is undesirable to place the inlet passageways 267 in alignment with the axis of the wristpin 210 because the stationary oil jets 270 would require provision of engine space between cylinders, thereby increasing inter-cylinder spacing and engine length. The inlet passageways 267 cannot be placed in the locations occupied by the fasteners 202 shown in FIG. 3. Consequently, the optimal locations available for the inlet passageways 267 in the wristpin assembly 200 shown on FIGS. 3 and 4 are the diametrically-opposed portions of the upper support member that are aligned orthogonally to the wristpin 210. However even these locations have drawbacks. For example, clearance between the cylinder sidewall 271 and the sides of cylinder block 274 must be provided for placement of the stationary oil jets 270, which places a lower limit on a width of the engine. Further, the stationary oil jets 270 protrude into the pie-slice-shaped envelope of motion 273 through which the connecting rod 120 travels. Clearance between the connecting rod 120 and the stationary oil jets 270 is obtained by forming the elongate longitudinal slots 125 in the shaft of the connecting rod 120, which weakens the connecting rod 120 and increases its cost of manufacture. The same drawbacks are evident in similar single-piece wristpin bearing structures that are shown in U.S. Pat. Nos. 9,038,593 and 9,175,725.

Figure 5:
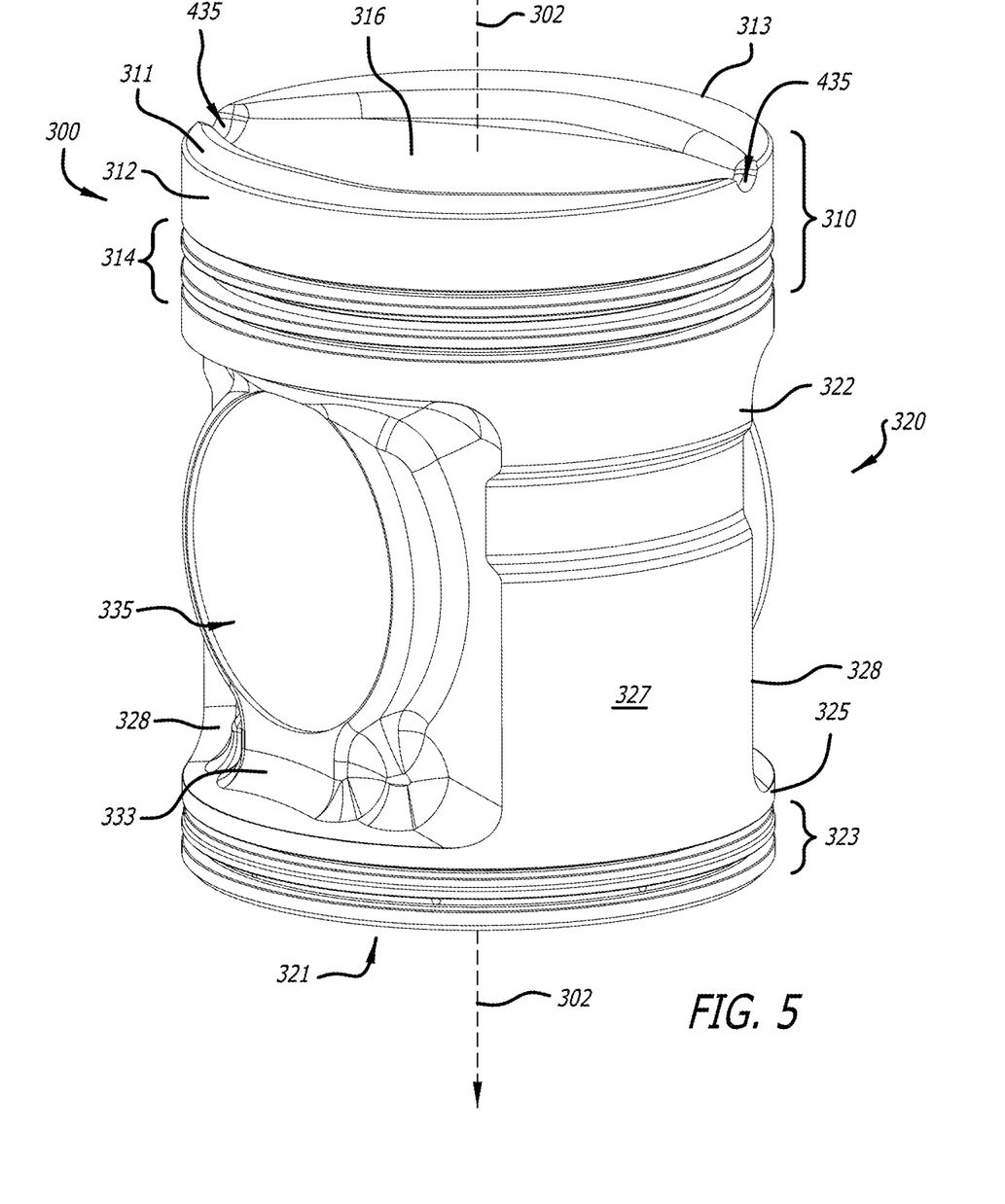
FIG. 5 is an isometric view of a piston constructed for use in an opposed-piston engine according to the invention.
Figure 6A:
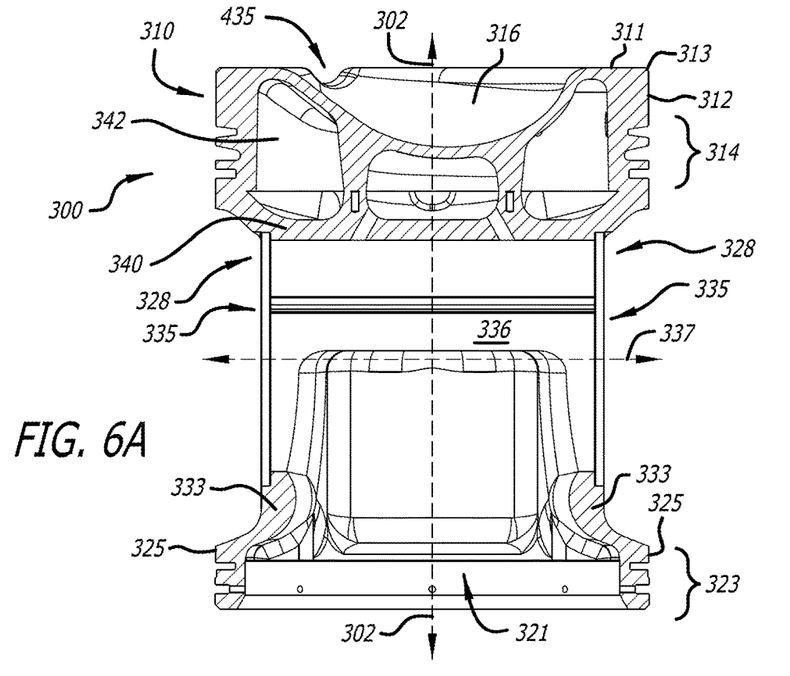
FIGS. 6A and 6B are side sectional views of the piston of FIG. 5, without a wristpin installed in a wristpin bore, taken along orthogonal central planes that pass through a skirt of the piston.
Figure 6B:
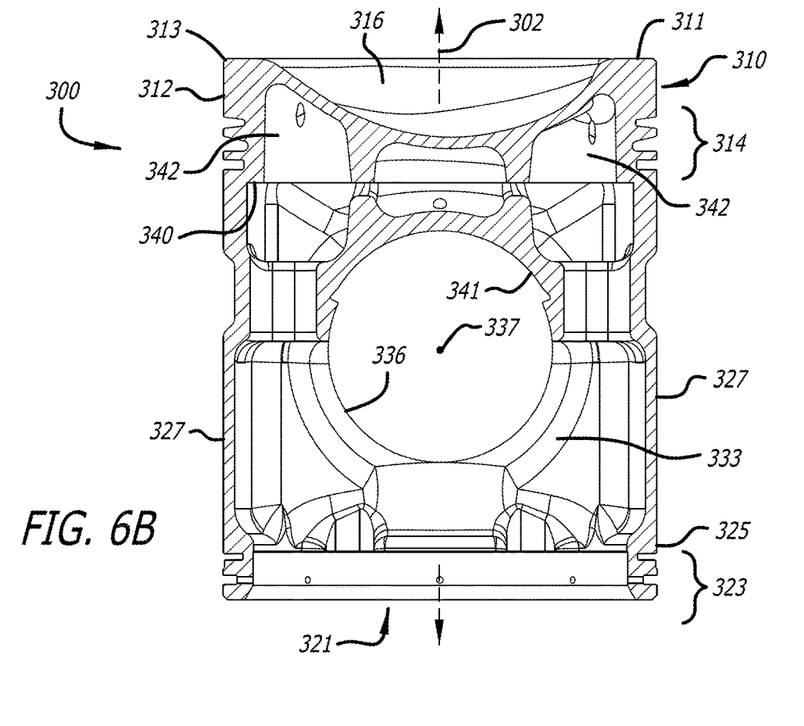

Elimination of the Wristpin Support Structure:

A construction for a simpler, lighter piston for an opposed-piston engine eliminates the internal wristpin support structure of the prior art. FIGS. 5, 6A, and 6B illustrate an example of a piston 300 for an opposed-piston engine without the construction limitations associated with wristpin assemblies such as are shown in FIGS. 3 and 4. The piston 300 has a longitudinal axis 302, a crown 310 with an end surface 311, and a skirt 320 attached to or formed integrally with the crown. The crown 310 has a cylindrical sidewall comprising a substantially circumferential land 312 (called the "top land" because of its proximity to the end surface 311) that meets the end surface 311 at a substantially circular peripheral edge 313 which is centered on the longitudinal axis 302. A substantially circumferential inner ring belt region 314 on the crown extends away from the land 312 in the direction of the skirt 320.

The skirt 320 comprises a sidewall 322 that extends away from the crown 310 to an open outer end 321 of the skirt. The end surface 311 is shaped to form a combustion chamber with an adjacent end surface of an opposing piston in an opposed-piston engine. The shape of the end surface 311 includes a bowl 316 that is configured to define the combustion chamber, not with a cylinder head, but with a bowl in the end surface of the opposing piston. The shape shown in FIG. 5 of the end surface 311 limits the scope of the invention only to the extent that it cooperates with the end surface of an opposing piston to form a combustion chamber in an opposed-piston engine. It is possible, but not necessary that the end surfaces will have identical shapes. Many such end surface shapes are possible; see, for example, the piston end surface constructions described and illustrated in U.S. Pat. No. 8,800,528, US publication 2013/0213342, WO publication 2012/158756, US publication 2014/0014063, US publication 2015/0122227, US publication 2016/0290224, and US publication 2017/0030262.

An outer ring belt region 323 is formed in a circumferential portion 325 of the sidewall 322 near the outer end 321 of the piston. The sidewall 322 is formed with two opposing curved sidewall portions 327 separated from one another by two opposing box wall portions 328. The curved sidewall portions 327 extend away from the crown 310 toward the open end 321. Relative to the longitudinal axis 302, the curved sidewall portions 327 may have the same radius as the crown 310 and the circumferential portion 325 of the sidewall. In other instances, the curved sidewall portions may have shapes and dimensions adapted for accommodating thrust differentials experienced during engine operation. The box wall portions 328 are inset from the curved sidewall portions 327 and run longitudinally in portions of the sidewall 322 between the inner ring belt region 314 and the outer ring belt region 323. The box wall portions 328 have wristpin bosses 333 in which diametrically-opposed, laterally-spaced wristpin bore openings 335 are formed at respective ends of a wristpin bore 336. The wristpin bore openings 335 are coaxially aligned along a wristpin bore axis 337. A particular piston bearing embodiment will now be described, although this embodiment is presented for the purpose of illustration only. Other bearing constructions are contemplated, although all will utilize the laterally-spaced wristpin bore openings 335.

Figure 6C:
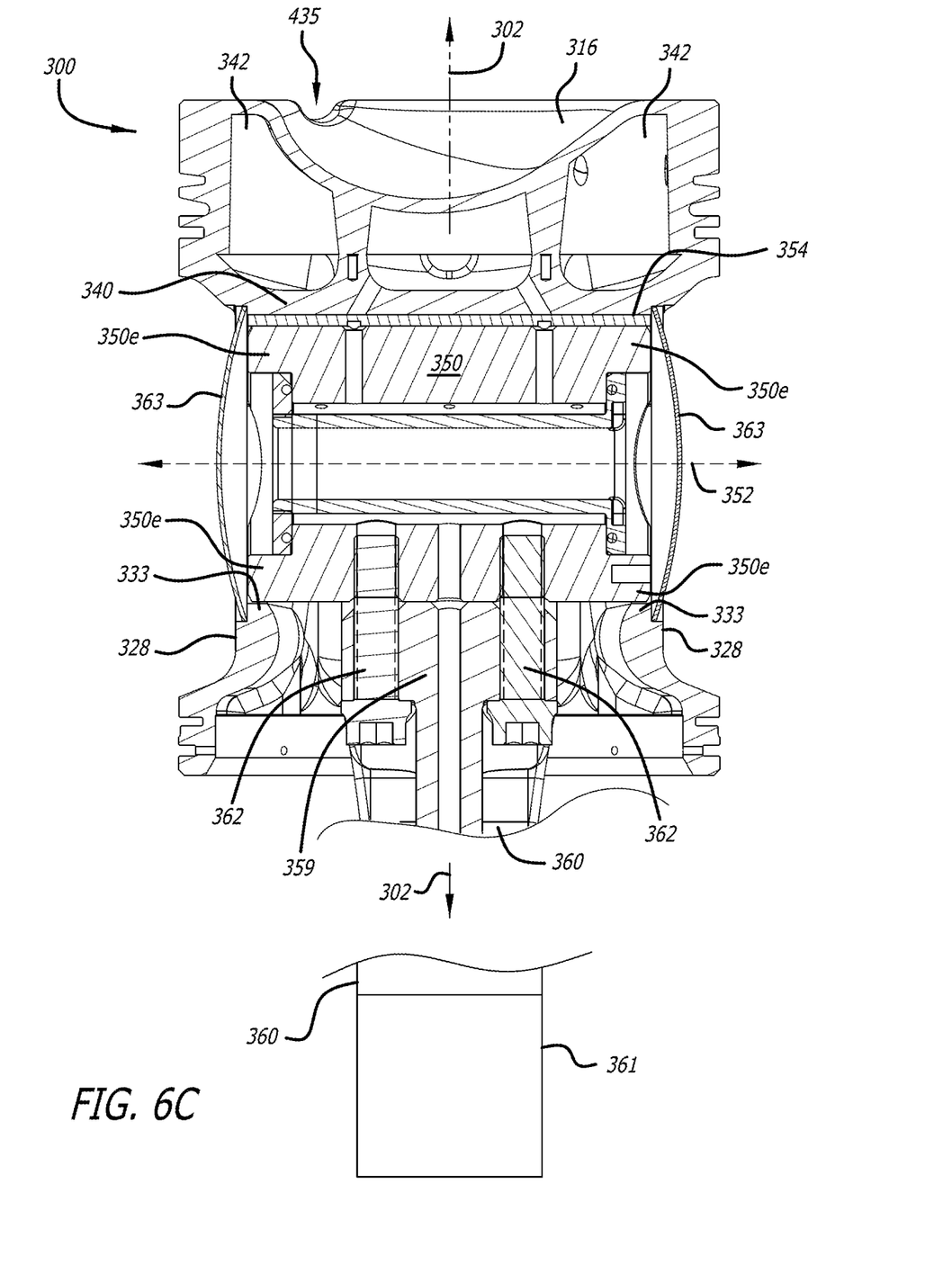
FIG. 6C is a side sectional view of the piston of FIG. 5 that corresponds to the view seen in FIG. 6A, with a wristpin installed in the wristpin bore.

With reference to FIGS. 6A, 6B, and 6C the piston 300 includes an interior wall 340 that defines a portion of the wristpin bore 336 where a wristpin 350 with a wristpin axis 352 is received and retained. One side of the interior wall 340 extends between the wristpin bore openings 335. In the example shown, a bearing sleeve 354 is received and seated in a recessed portion 341 of the one side. Together, the sleeve 354 and the wristpin bore openings 335 define the wristpin bore 336 of this example. As per FIGS. 6A, 6B, and 6C, an interior annular cooling gallery 342 is defined at least partially by an inner surface of the substantially circumferential top land 312. The interior wall 340 also functions as the bottom wall of an interior annular cooling gallery 342 which is situated in the crown 310 to enable cooling of the land 312 and the inner ring region 314 during engine operation.

FIG. 6C shows a piston assembly in which the wristpin 350 is installed in the wristpin bore of the piston 300. The wristpin 350 has two ends 350e that are received and supported in the wristpin bore openings 335. The wristpin 350 has a journal surface that rotates against an opposing surface of the bearing sleeve 354 and the two ends 350e. The wristpin 350 is attached to the small end 359 of a connecting rod 360 by threaded fasteners 362, which configures the piston for installation in an opposed-piston engine in the manner shown in FIG. 1 in which the large end 361 of the connecting rod would be coupled to a crankpin of a crankshaft. The wristpin 350 is secured against lateral movement in the wristpin bore by disc-shaped caps 363 retained in the bosses 333 by standard features such as grooves, press fitting, and so on.

Opposing Injection Regions:

The piston construction thus far described eliminates any need for the wristpin support structure of the prior art piston of FIGS. 2-4. With this improvement, restrictions on placement of elements that deliver coolant and fuel to the piston are significantly relaxed. The beneficial results may be understood with reference to FIGS. 7-9.

Figure 7:
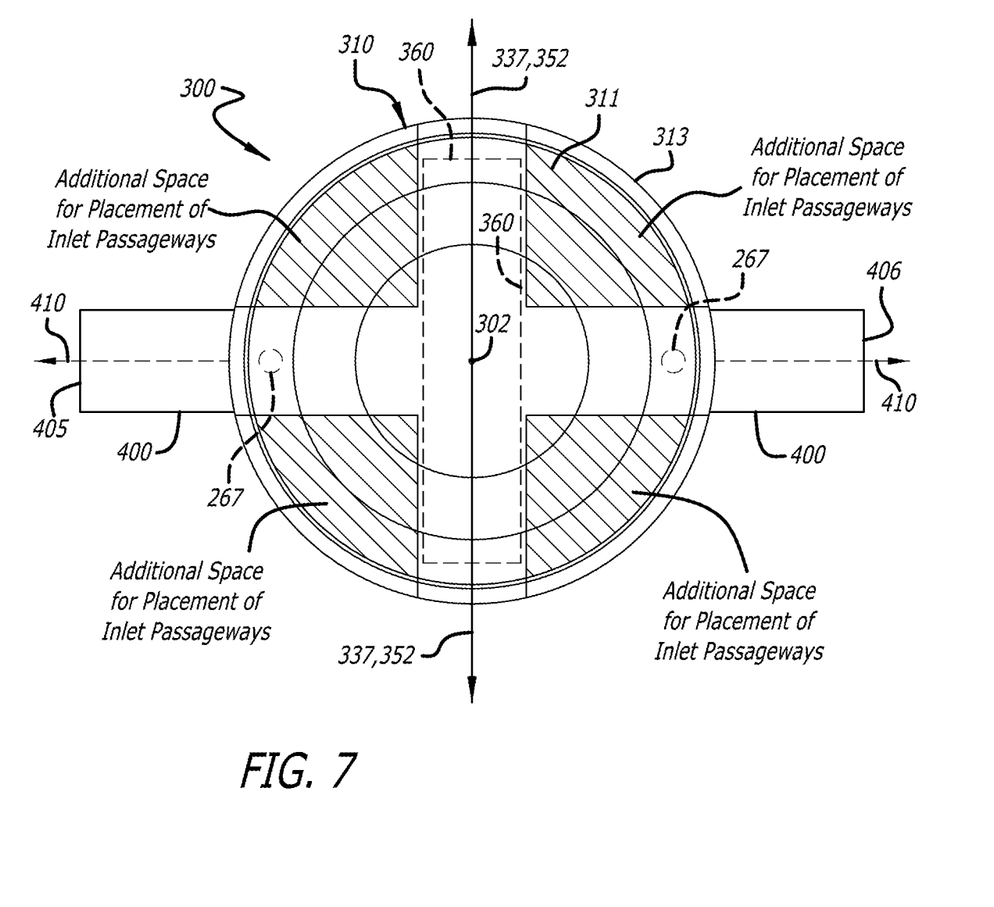
FIG. 7 is a schematic figure showing the end surface of the piston of FIG. 5 in plan, without end surface features.

FIG. 7 is a schematic diagram in which the end surface 311 on the crown 310 of the piston 300 is seen in plan, without surface features, together with a motion envelope 400 representing the moving 360° circular path that the big end 361 (FIG. 6C) of the connecting rod travels as the piston 300 reciprocates between TC and BC locations during engine operation. The outer edges 405 and 406 of the motion envelope 400 represent the extreme positions reached by the outer edges of the big end 361 when the piston 300 is midway between TC and BC on successive strokes of engine operation. The envelope of motion 400 may be defined by an envelope axis 410, the envelope axis 410 being substantially orthogonal to the wristpin axis 352, when the wristpin 350 and the connecting rod 360 are assembled to the piston as shown in FIG. 6C; without the wristpin 350 and connecting rod 360 coupled to the piston (FIGS. 6A and 6B), the same relationship is given by the wristpin bore axis 337, and a diameter of the substantially circular peripheral edge 313 that is orthogonal to the wristpin bore axis 337.

The usual prior art locations of the inlet passageways as constrained by the prior art wrist pin support structure shown in FIGS. 3 and 4 are indicated in FIG. 7 by reference numerals 267. However since there is no separate wristpin support structure to attach to the interior of the piston 300 shown in FIGS. 5 and 6A-6C, inlet passageways are not limited to being situated at diametrically-opposed locations that are aligned orthogonally to the wristpin 350 (as is illustrated by the case with the prior art arrangements exemplified by FIG. 4). Instead, inlet passageways are free to be situated at locations that are offset arcuately between the wristpin 350 and the envelope of motion 400, with the result that unique piston configurations are made possible. These locations are indicated by the shaded areas labeled "Additional Space for Placement of Inlet Passageways" in FIG. 7.

Figure 8:
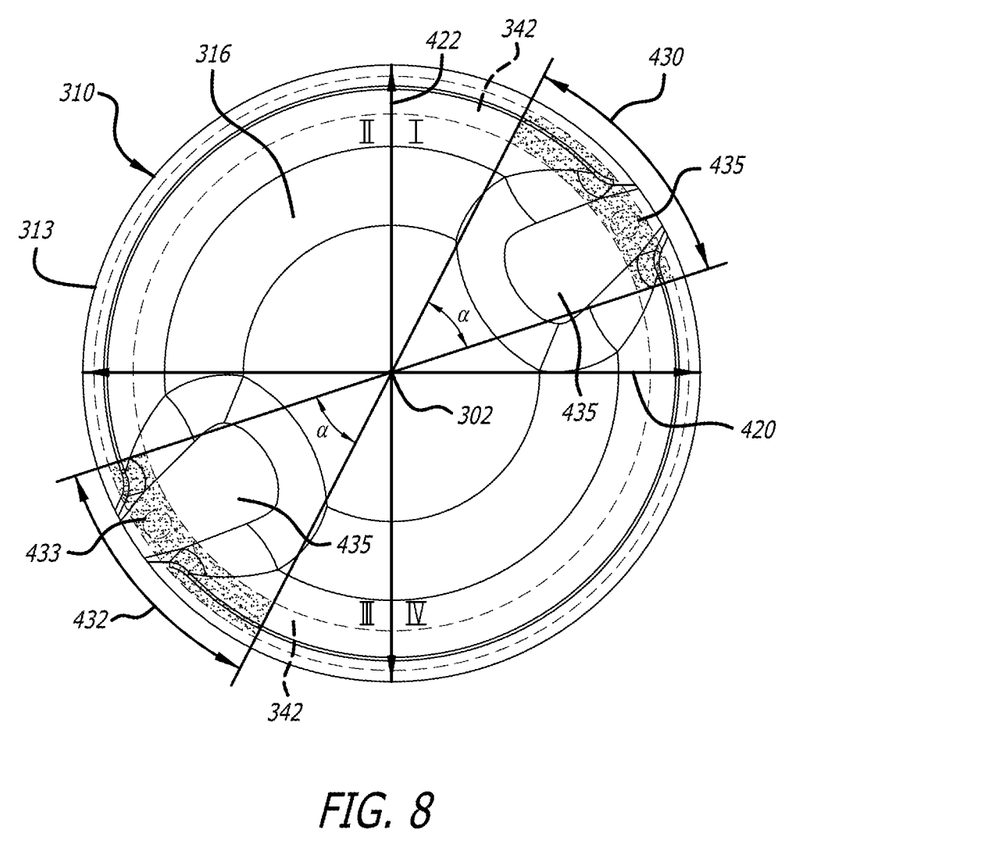
FIG. 8 is a schematic figure showing the end surface of the piston of FIG. 5 in plan, with end surface features according to the invention.
Figure 9:
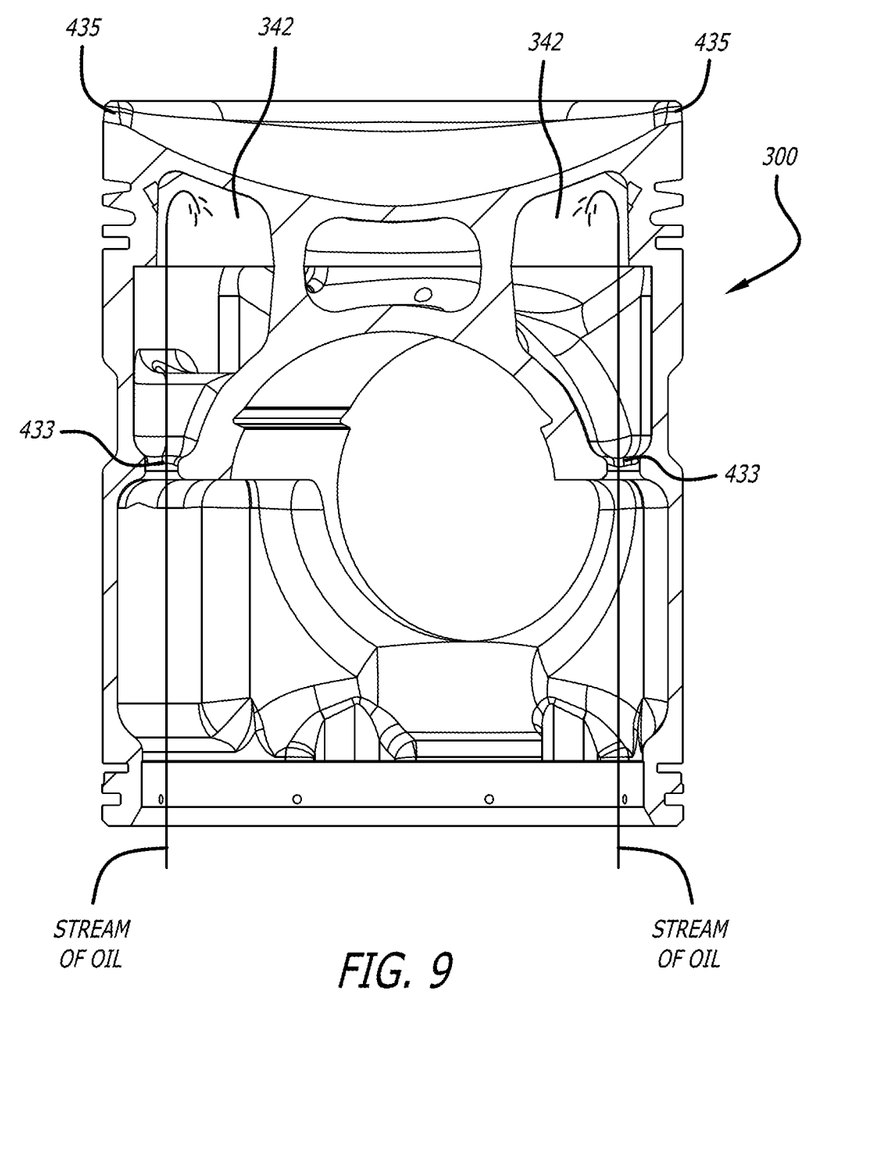
FIG. 9 is a side sectional view of the piston of FIG. 5 taken along a central plane passing through opposing injector trenches to show alignment of oil jet inlet passageways with the injector trenches.

FIG. 8 shows the end surface 311 of the crown 310 with the substantially circular peripheral edge 313, the bowl 316, and the longitudinal axis 302 of the piston visible. The interior annular cooling gallery 342 is indicated by dashed lines. A conventional 2-dimensional grid is superimposed on the end surface for the purpose of illustrating aspects of the invention. The 2-dimensional grid has a first axis 420 and a second axis 422 that is orthogonal to the first axis 420. If the piston 300 is not fully assembled (as seen in FIGS. 6A and 6B) one of the axes 420, 422 corresponds to the wristpin bore axis 337 and the other of the axes 420, 422 is a diameter of the substantially circular peripheral edge 313 of the piston 300; otherwise, if the piston is fully assembled as shown in FIG. 6C, one of the axes corresponds to the wristpin axis 352 and the other axis corresponds to the envelope axis 410. The orthogonal axes 420 and 422 define four quadrants of the end surface 311. For illustration, these quadrants may be denoted as I, II, III, and IV, in the usual fashion. The end surface 311 includes a pair of injection regions 430 and 432 across which fuel is directly injected by fuel injectors (which are not shown) into a combustion chamber formed at least partially by the bowl 316. Inlet passageways 433 for admission of streams of oil into the interior annular cooling gallery 342 are situated in the interior wall 340 substantially in alignment with the injection regions 430 and 432.

The injection regions 430 and 432 are disposed in respective diametrically-opposed quadrants of the end surface 311. The figure shows the injection regions 430 and 432 disposed in quadrants I and III, but this is not meant to be limiting as they may alternatively be in quadrants II and IV, together with the inlet passageways 433. Each one of the injection regions 430 and 432 extends along a respective arcuate section of the substantially circular peripheral edge 313 and is concentric with the substantially circular peripheral edge. The injection regions 430 and 432 may or may not be aligned in diametric opposition. Preferably, the arcuate extent of each of the injection regions 430 and 432 subtends an angle $\alpha$ of about 50-70 degrees with the vertex of the angle being at the center of the substantially circular peripheral edge, which is coincident with the longitudinal axis 302.

As per FIG. 8, in most cases injection trenches 435 are formed in the crown 310 in peripheral portions of the end surface 311 to accommodate fuel injection from fuel injector nozzles into the bowl 316. Each injection trench 435 is situated in a respective one of the injection regions 430 and 432. Each injection trench extends from the substantially circular peripheral edge 313 to the bowl 316. The injection trenches 435 have shapes that guide fuel sprays emitted by fuel injectors in predetermined directions into turbulent charge air in a combustion chamber formed in part by the bowl 316. Preferably the end surface 311 has a pair of injection trenches 435. FIG. 8 shows two injection trenches 435 aligned substantially in diametric opposition across the bowl 316. However this is not intended to be limiting. There may be cases in which the injection regions have no trenches, but may be contoured in some manner to accommodate a particular fuel spray pattern. For example an injection region may have a smoothly-curved, somewhat shallow depression formed to accommodate a particular fuel spray pattern. Further, the relative positioning of the trenches may deviate from diametric opposition according to design considerations regarding engine construction and combustion performance.

The shapes of injection trenches often present edges and other surface irregularities where hot spots occur in the piston end surface during combustion. Hot spots lead to asymmetrical thermal stress, wear, and possibly piston crown fracture. Even in cases where the surface contour is less emphatic, such as without trenches, the injection regions may endure a higher thermal load than end surface regions closer to the interior of the bowl. In any event, it is desirable to provide directed cooling to the portions of the crown undersurface that are beneath the injection regions. Thus, in the example shown in FIGS. 8 and 9, the inlet passageways 433 are in substantial circumferential alignment with the trenches 435, thereby positioned to guide respective streams of oil emitted by stationary jets into the annular cooling gallery 342, where the streams may impinge on surface portions of the annular cooling gallery which are nearest the trenches 435. Impinging oil streams can provide a relatively high heat transfer characteristic to the regions of the crown where hot spots related to the injection regions occur.

The materials and methods of construction of the piston 300 may be conventional for light, medium and/or heavy duty use or for large bore applications. For example, the crown and skirt part may be formed separately of compatible and/or complementary materials (e.g., forged steel crown, cast iron skirt part) and joined by welding or brazing. Additionally, or alternatively, forming technology including printing technology can be used to form some or all of the piston 300 and its components. Materials can include laminated structures, hybrid structures, composite structures, and the like, including thermal barrier coatings, ceramic-metal composites (e.g., cermets), high-temperature metal alloys, and laser ablated/structured surfaces.

Engine Application.

Figure 10:
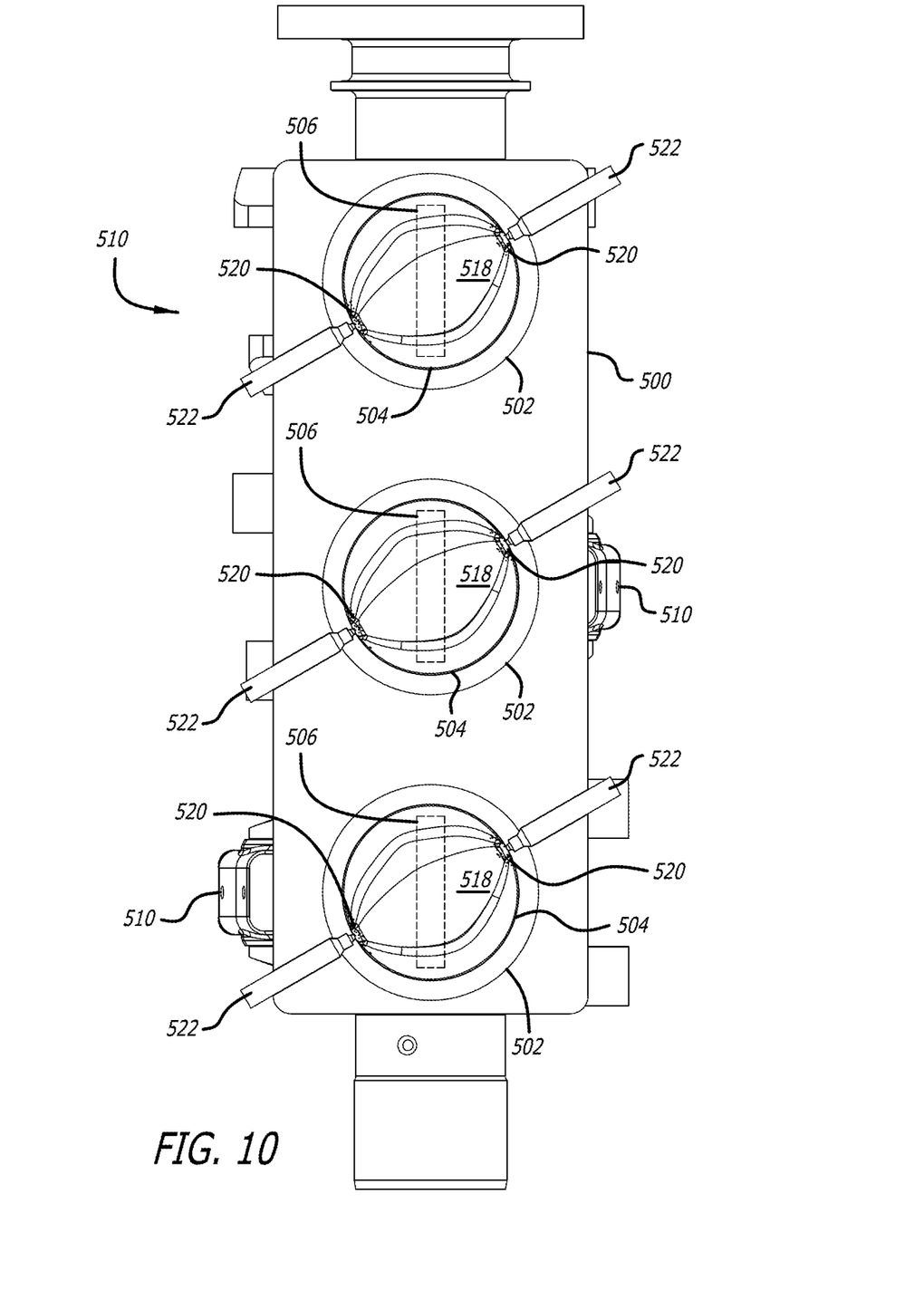
FIG. 10 is a partially schematic view through a medial cut plane of an opposed-piston engine having a cylinder block in which the cylinders are equipped with pistons according to the invention.

FIG. 10 shows an engine configuration made possible by the unique piston construction shown in FIGS. 5-6C. FIG. 10 is a partially schematic view taken through a medial cut plane of an opposed-piston engine having a cylinder block 500 with a plurality of cylinders 502 disposed in an inline array along a length of the cylinder block. Although half of each cylinder and only one piston per cylinder is seen, the craftsman of ordinary skill will appreciate that a pair of pistons is disposed in opposition in each cylinder 502. Each piston 504 comprises a piston assembly constructed according to FIGS. 6C and 8, which includes a wristpin 506 with a wristpin axis which couples the piston to a connecting rod 510 that swings in a connecting rod motion envelope having an envelope axis that is substantially orthogonal to the wristpin axis. Each piston 504 of each pair of pistons has a crown with an end surface and a bowl 518 in the end surface configured to form a combustion chamber in cooperation with the bowl of the opposing piston. The end surface includes a pair of injection regions 520 across which fuel is injected into the bowl. The injection regions 520 are disposed in respective diametrically-opposed quadrants of the end surface that are defined by the wristpin axis and the envelope axis as per FIG. 8. As illustrated in FIG. 8, each injection region extends along a respective arc concentric with the substantially circular peripheral edge of the crown. This configuration allows for compact construction of the engine because the stationary oil jets can be moved inwardly of the side walls of the crankcases, and fuel injectors 522 may be mounted obliquely with respect to the length of the cylinder block, thereby yielding a more compact engine profile. Further, this configuration allows for a simplified and strengthened construction of the connecting rods 510 which no longer have to accommodate the stationary oil jets.

Those skilled in the art will appreciate that the specific embodiments set forth in this specification are merely illustrative of the invention and that various modifications are possible and may be made thereto without departing from the scope of the invention.

The invention claimed is:

1. An opposed-piston engine, comprising:
a cylinder block with a plurality of cylinders disposed in an inline array along a length of the cylinder block;
a pair of pistons disposed in opposition in each cylinder;
each piston of the pair of pistons comprising an inner ring belt region, an outer ring belt region, and a wristpin bore with a wristpin axis, the wristpin bore for receiving a wristpin coupling the piston to a connecting rod that swings in a connecting rod motion envelope that is substantially orthogonal to the wristpin axis, the piston further comprising a crown with an end surface and a bowl in the end surface configured to form a combustion chamber in cooperation with a bowl of an adjacent end surface of an opposing piston, the end surface including a pair of injection regions across which fuel is injected into the bowl;
a respective injection trench situated in each injection region;
wherein the injection regions are disposed in respective diametrically-opposed quadrants of the end surface, situated at locations that are offset arcuately between the wristpin bore axis and the envelope of motion;
wherein each injection region extends along a respective arc concentric with the center of the circular peripheral edge; and,
wherein the respective arc of each injection region subtends an angle of 50-70 degrees, with the vertex of the angle being coincident with a longitudinal axis of the piston.

2. The engine of claim 1, the wristpin bore comprising a first opening formed in a first pin boss in the sidewall and a second opening formed in a second pin boss in the sidewall, the openings being coaxially aligned along the wristpin axis.

3. The engine of claim 1, the crown further comprising an interior annular cooling gallery defined at least partially by an inner surface of a substantially circumferential top land of the crown, and inlet passageways positioned in the interior annular cooling gallery in alignment with the injection regions.

4. The engine of claim 1, the crown further comprising an interior annular cooling gallery defined at least partially by an inner surface of a substantially circumferential top land of the crown, and inlet passageways positioned in the interior annular cooling gallery in alignment with the injection trenches and positioned to guide respective streams of oil emitted by stationary jets into the annular cooling gallery.

5. The engine of claim 1, in which the injection trenches are positioned along respective arcuate portions of the substantially circular peripheral edge, each arcuate portion spanning about 70° and being substantially centered in one of the diametrically-opposed quadrants.

\* \* \* \* \*